July 13, 1965
E. S. JACOBSEN
3,193,965
FISHING WORM HARNESS
Filed April 9, 1964
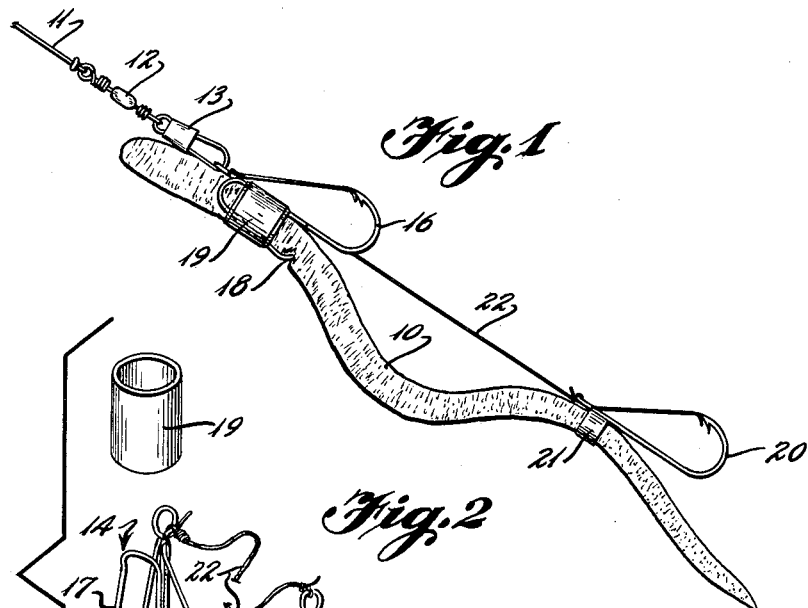
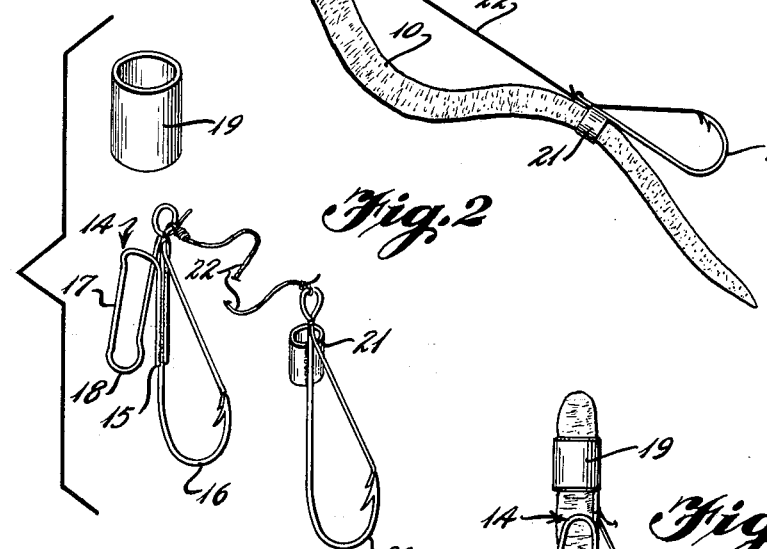
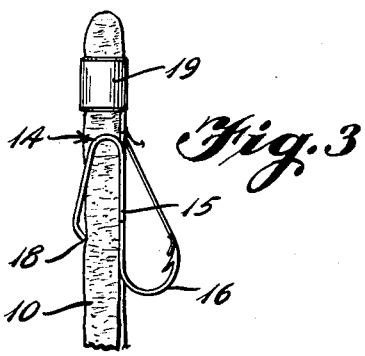
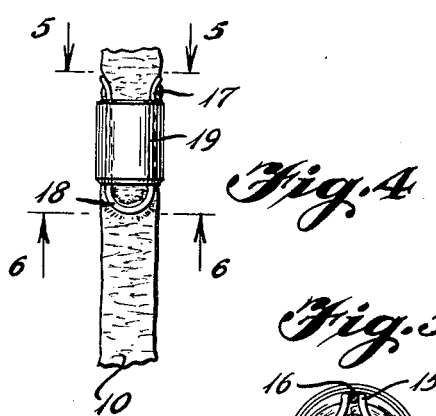
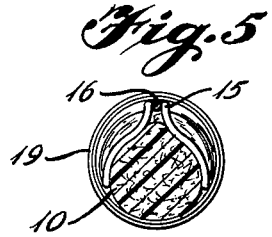
INVENTOR
Ernst S. Jacobsen
BY
ATTORNEY

United States Patent Office 3,193,965
Patented July 13, 1965

3,193,965
FISHING WORM HARNESS
Ernst S. Jacobsen, 8200 S. Orange Blossom Trail, Orlando, Fla.
Filed Apr. 9, 1964, Ser. No. 358,423
2 Claims. (Cl. 43—44.4)

This invention relates to hunting and trapping, especially the hunting and trapping of fish and other marine life, and to bait or lures and other equipment employed in the trapping and catching of the same.

The invention relates particularly to a harness for use selectively on one of a number of artificial worms of varying characteristics as to color and the like used as a bait or lures in fishing, and which harness will facilitate the easy change of such worms while fishing.

Enjoyment of the sport of fishing depends to a degree on the success attained and it is believed that a prerequisite of a good fisherman includes an assortment of bait, live or artificial, with the latter of a kind to produce action or motion in the water to attract the fish. Also it is important to fishermen to be able to change bait or lures quickly, including artificial worms of rubber or other resilient material and of various colors, and to maintain them unmutilated so that they can be repeatedly reused, it having been customary to insert hooks through the worms and damage the same so that they last for only a short time.

It is an object of the invention to provide a relatively simple inexpensive and durable rig or harness for holding to an artificial worm used as bait when fishing, and by means of which a worm may be selectively and repeatedly used without mutilation and readily changed by the fisherman, and with such harness having positive means for fastening the work in the harness to prevent it from slipping or being pulled out, as well as a harness that will give a worm live action subject to adjustment and under the control of the fisherman.

Other objects and advantages of the invention will be apparent from the following description taken in conjunction with the accompanying drawing in which:

FIG. 1 is a side elevation illustrating the invention in use;

FIG. 2, an exploded view of the parts which constitute the invention;

FIG. 3, a fragmentary side elevation illustrating the relation of the parts before the locking sleeve is in its final position;

FIG. 4, a view at right angles to FIG. 3 after the sleeve is in locking position;

FIG. 5, a section on the line 5—5 of FIG. 4; and

FIG. 6, a section on the line 6—6 of FIG. 4.

Briefly stated the invention is a harness for attachment to a line used in fishing and such harness comprises a swivel, a safety pin type fastener, a worm gripping spring clip or holder, and a pair of adjustably connected upper and lower hooks, the upper hook or hook nearest the swivel or attaching end of the device, being fixed to a worm receiving and retaining spring clip having a part in which a conventional artificial and resilient worm of the desired characteristics including color is adapted to be received, and a collar slideable thereonto to compress and cause contraction of the clip and firmly and securely hold the worm, the lower hook being fixed to a sleeve which can be adjusted lengthwise of the worm on account of its resiliency and stretchability to vary the action of the worm in the water.

With continued reference to the drawing the harness or rig of the present invention, by which a selected conventional artificial and resilient worm 10 of the desired color may be attached to the end of a fishing line 11, comprises a swivel 12, a safety pin type fastener 13, and worm gripping element in the form of a spring clip composed of a pair of U-shaped spring wire members 14. Between one pair of legs 15 of the U-shaped members is attached a hook 16, the other pair of legs 17 being connected by a bight 18 which spaces the legs apart substantially the diameter of the worm 10 to allow the ready insertion of the worm in such worm holder.

In order to clamp the worm in place, a sleeve 19 of plastic or other lightweight material and of a diameter to permit the worm containing spring clip to be readily slideably received therein and contracted sufficiently to grip and hold the worm in a position that the hook 16, or upper hook, is nearer the end of the worm. A second hook 20 is fixed to a slightly smaller sleeve 21 which likewise may be readily adjusted lengthwise of the smaller portion of the worm 10, a line 22 connecting the eyes of the hooks 16 and 20.

It will be apparent from the foregoing that a relatively simple practical and useful harness is provided by which a selected artificial worm may be snugly and encirclingly gripped and firmly secured to and held by a fishing line.

In the application of the harness, the upper end portion of the artificial worm is inserted between the pair of U-shaped spring wire members of the spring clip with the head of the worm free and the collar is forced over the clip causing a contraction of the latter and the firm gripping and holding of the worm. The second hook attached to the sleeve of smaller diameter is applied over the rear or tail portion of the worm and if desired the tail of the worm may be inserted through the curved portion of the hook. The second hook may be adjusted to any desired lengthwise position relative to the spring clip to provide the desired amount of slack in the line between the hooks in order to control the amount of action of the worm in the water.

The construction described results in a reliable harness by which an artificial worm may be selected of the desired characteristics including as to color, and the worm may be readily and easily harnessed or unharnessed and another harnessed without inserting the hook through the worm or other mutilating operation.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A harness for attachment to a fishing line for holding a fishing worm, said harness comprising an expandable and contractable spring clip having a pair of U-shaped wire members with a pair of legs spaced substantially corresponding to the diameter of a worm to be held and a second pair of legs in close proximity, a sleeve slideable onto said spring clip and into engagement with all four legs for contracting the same into contact with a worm, and a hook fixed to said spring clip.

2. The structure of claim 1, and a second hook, a sleeve fixed to said hook and adjustable lengthwise of a worm on which the harness is applied so that the tail of the worm can be inserted through the said sleeve, and a line connecting said hooks.

References Cited by the Examiner
UNITED STATES PATENTS

| | | | |
|---|---|---|---|
| 2,686,381 | 8/54 | Peterson | 43—44.4 X |
| 2,894,351 | 7/59 | Doane | 43—44.6 |
| 3,046,689 | 7/62 | Woodley | 43—44.4 X |
| 3,147,564 | 9/64 | Messler | 43—42.24 X |

SAMUEL KOREN, *Primary Examiner.*